(12) United States Patent
Chen et al.

(10) Patent No.: US 6,555,237 B1
(45) Date of Patent: Apr. 29, 2003

(54) FUSER SYSTEM WITH DONOR ROLLER HAVING A CONTROLLED SWELL RELEASE AGENT SURFACE LAYER

(75) Inventors: Jiann Hsing Chen, Fairport, NY (US); Joseph A. Pavlisko, Pittsford, NY (US); Muhammed Aslam, Rochester, NY (US); Fangsheng Wu, Rochester, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/957,127

(22) Filed: Sep. 20, 2001

(51) Int. Cl.⁷ .................................. B32B 9/04
(52) U.S. Cl. .................. 428/447; 428/450; 528/31; 524/588; 399/333; 492/56; 492/59
(58) Field of Search ................... 428/450, 447; 528/31; 399/333; 492/56, 59; 524/588

(56) References Cited

U.S. PATENT DOCUMENTS

| | | |
|---|---|---|
| 3,964,431 A | 6/1976 | Namiki |
| 4,029,827 A | 6/1977 | Imperial et al. |
| 4,056,706 A | 11/1977 | Strella |
| 4,101,686 A | 7/1978 | Strella et al. |
| 4,185,140 A | 1/1980 | Strella et al. |
| 4,257,699 A | 3/1981 | Lentz |
| 4,264,181 A | 4/1981 | Lentz et al. |
| 4,272,179 A | 6/1981 | Seanor |
| 4,659,621 A | 4/1987 | Finn et al. |
| 5,049,943 A * | 9/1991 | Menjo et al. ................ 355/284 |
| 5,061,965 A | 10/1991 | Ferguson et al. |
| 5,141,788 A | 8/1992 | Badesha et al. |
| 5,157,445 A | 10/1992 | Shoji et al. |
| 5,166,031 A | 11/1992 | Badesha et al. |
| 5,269,740 A | 12/1993 | Fitzgerald et al. |
| 5,281,506 A | 1/1994 | Badesha et al. |
| 5,292,562 A | 3/1994 | Fitzgerald et al. |
| 5,292,606 A | 3/1994 | Fitzgerald |
| 5,336,539 A | 8/1994 | Fitzgerald |
| 5,366,772 A | 11/1994 | Badesha et al. |
| 5,370,931 A | 12/1994 | Fratangelo et al. |
| 5,480,938 A | 1/1996 | Badesha et al. |
| 5,587,245 A | 12/1996 | Visser et al. |
| 5,716,714 A | 2/1998 | Chen et al. |
| 5,846,643 A | 12/1998 | Badesha et al. |
| 5,918,098 A | 6/1999 | Van Bennekom |
| 5,960,245 A | 9/1999 | Chen et al. |
| 6,020,038 A | 2/2000 | Chen et al. |
| 6,037,092 A | 3/2000 | Heeks et al. |
| 6,067,438 A | 5/2000 | Chen et al. |
| 6,075,966 A | 6/2000 | Davis et al. |
| 6,099,673 A | 8/2000 | Van Bennekom |
| 6,127,041 A | 10/2000 | Szostek et al. |
| 6,159,588 A | 12/2000 | Eddy et al. |
| 6,168,867 B1 * | 1/2001 | Davis et al. ................ 428/450 |
| 6,190,771 B1 | 2/2001 | Chen et al. |
| 6,225,409 B1 | 5/2001 | Davis et al. |

* cited by examiner

*Primary Examiner*—Margaret G. Moore (57) ABSTRACT

Disclosed is a release agent donor roller, and methods and fusing systems which incorporate the donor roller, for applying a polymeric release agent to a fuser roller in an electrophotographic apparatus. The donor roller comprises a base member with a polymeric outer layer thereover comprising a silicone material with a controlled, relatively high swelling characteristic in the release agent, i.e., the layer has a swell in 300 cts poly(dimethylsiloxane) oil maintained at a temperature of 175° C. after 24 hours exposure of greater than 15% by weight. When operated in a fusing system, the donor roller exhibits relatively low toner contamination levels, even for relatively low melting polymer binder resins used in producing toners, such as polyester resins. The swell characteristic is still at an acceptable level such that the donor roller has adequate mechanical stability.

36 Claims, 1 Drawing Sheet

FIG. 1

FIG. 2 ns of the second sheet. In addition,

FUSER SYSTEM WITH DONOR ROLLER HAVING A CONTROLLED SWELL RELEASE AGENT SURFACE LAYER

FIELD OF THE INVENTION

The present invention relates generally to electrostatographic printing and/or reproduction devices, and more particularly to fuser apparatus comprising a donor roller having a polymeric surface layer thereon which is release agent swellable and resistant to toner contamination. The fuser apparatus is particularly useful for fusing toners prepared with relatively low-melting polymeric binder resins, such as polyester resins, employed in process color applications and/or high-speed printing or reproduction processes.

BACKGROUND OF THE INVENTION

In the process of electrophotography, a light image of an original document to be printed or copied is typically recorded by either digital or analog means in the form of an electrostatic latent image upon a photosensitive member with subsequent rendering to make the latent image visible by application of electrostatically charged marking particles, commonly referred to as toner. The residual toner image can be either fixed directly upon the photosensitive member, or transferred from the photosensitive member to another support or receiver member, such as a sheet of plain paper, with subsequent affixing of the toner image thereto.

In order to fix or otherwise fuse the toner material onto a support member permanently, it is generally necessary to apply heat so as to elevate the toner material to a temperature at which constituents of the toner material coalesce and become tacky. This action causes the toner to flow to some extent into the fibers or pores of the support member or to otherwise adhere to the surface thereof. Thereafter, as the toner material cools, solidification occurs causing the toner material to be bound firmly to the receiver.

One method for thermal fusing of toner images onto a supporting substrate has been to pass the receiver with an unfused toner image thereon between a toning nip formed by a pair of opposed roller members that are in contact with each other, wherein at least one of the roller members is heated. During operation of a fusing system of this type, the receiver to which the toner image is electrostatically adhered is moved through the nip formed between the rolls with the toner image contacting the fuser roller thereby to affect heating of the toner image within the nip. Typical of such fusing devices are two roller systems wherein a fuser roller is coated with an abhesive material, such as a silicone rubber; other low surface energy elastomers, such as a Viton® fluoroelastomers available from E. I. DuPont De Nemours of Wilmington, Del.; or other low surface energy material, such as tetrafluoroethylene polymer resins like, for example, Teflon® resins also sold by DuPont. Silicone elastomers generally used to form a surface layer of the fuser member can be classified into three groups according to the vulcanization method and temperature employed to form such layer, i.e., room temperature vulcanization type silicone rubbers referred to as RTV silicone rubber; liquid silicone rubber referred to as LSR silicone rubber; and high temperature vulcanization type silicone rubber referred to as HTV rubber. These types of silicone elastomers are commercially available.

In the foregoing fusing systems, however, since the toner image is tackified by heat it frequently happens that a part of the image carried on the receiver will be retained by the heated fuser roller and not penetrate into the receiver surface. This tackified material can stick to the surface of the fusing roller and come in contact with a subsequent receiver sheet bearing another toner image to be fused. Thus, a tackified image which has been partially removed from a first sheet, may thereafter transfer to a subsequent second sheet in non-image portions of the second sheet. In addition, a portion of the tackified image of the second sheet may also adhere to the heated fuser roller. In this way and with the fusing of subsequent sheets bearing toner images, the fuser roller can eventually become thoroughly contaminated and unusable, thereby requiring replacement of the fuser roller itself. In addition, since the fuser roller continues to rotate when there is no substrate bearing a toner image to be fused, toner that may be adhered to the fuser roller can be transferred from the fuser roller to the pressure roller, and also to other rollers and components associated with the fuser system, thereby contaminating the overall fuser system. The foregoing conditions are referred to generally in the printing/copying art as "offset". Attempts have been made to control heat transfer to the toner and thereby control offset. However, even with abhesive surfaces provided by the silicone elastomers and the other materials mentioned hereinabove, this has not been entirely successful.

It has also been proposed to provide toner release agents such as silicone oil, and in particular poly(organosiloxane) oils like poly(dimethylsiloxane), that are applied to the surface of the fuser roller to act as a polymeric release agent and thereby reduce offset. The use of such release agents is reported, for example, in U.S. Pat. Nos. 3,964,431 and 4,056,706, the teachings of which are incorporated herein by reference. These release agents possess a relatively low surface energy and have been found generally suitable for use in a heated fuser roller environment. In practice, a thin layer of poly(organosiloxane) oil (also referenced as silicone oil hereinafter) release agent is applied to the surface of the heated fuser roller to form an interface between the fuser roller surface and the toner image carried on the support material. Thus, a low surface energy, easily parted layer is presented to the toners that pass through the fuser toning nip and thereby reduces the amount of toner which offsets to the fuser roller surface.

Some more recent developments in fuser rollers, polymeric release agents, and fusing systems are described in U.S. Pat. Nos. 4,264,181; 4,257,699; and 4,272,179, the teachings of which are also incorporated herein by reference. These patents describe fuser rollers and methods of fusing thermoplastic resin toner images to a substrate, wherein a poly(organosiloxane) type release agent having functional groups is applied to the surface of the fuser roller. The fuser roller employed generally consists of a base member having an elastomeric surface with a metal-containing filler material incorporated therein, wherein the elastomeric surface has been cured with a curing agent. Exemplary of such fuser rollers is an aluminum base member with a poly(vinylidenefluoride-hexafluoropropylene) copolymer (such as a Viton® type fluoroelastomer available from DuPont) cured with bisphenol curing agent and having lead oxide filler particles dispersed therein, and the fusing system generally utilizes a functionalized polyorganosiloxane oil as a polymeric release agent. In the disclosed fusing processes, the polymeric release agents have functional groups (also designated as chemically reactive functional groups) which are said to "interact" with the metal-containing filler dispersed in the elastomer material of the fuser roller surface to form a thermally stable film. The film is said to release thermoplastic resin toner or otherwise hinder the thermoplastic resin toner from contacting the elastomer material of the fuser roller surface so as to reduce toner offset thereon. A metal oxide, metal salt, metal alloy or other suitable metal compound filler dispersed in the elastomer or resin on the fuser roller surface is said to interact with the functional groups of the polymeric release agent to create this condition. Preferably, the metal-containing filler materials do not cause degradation of or have any adverse effect upon the polymeric release agent having functional groups. Because of the interaction between the elastomer having a metal containing filler and the polymeric release agent having functional groups, excellent release and the production of high quality copies are said to be obtained.

In the foregoing patents, the interaction of the functionalized polymeric release agent with elastomer surface is said to be especially useful for offset reduction in non-silicone elastomer based fusing systems, such as those based on a Viton® fluoroelastomer.

U.S. Pat. Nos. 4,029,827; 4,101,686; 4,185,140; and 5,157,445, also incorporated herein by reference, disclose the use of functionalized polymeric release agents which are also said to interact with an elastomeric surface of a fuser roller to form a thermally stable, renewable self cleaning layer with allegedly superior release properties with respect to thermoplastic resin toners. In particular, U.S. Pat. No. 4,029,827 is directed to the use of poly(organosiloxane) oils having mercapto-functionality. U.S. Pat. Nos. 4,101,686 and 4,185,140 are directed to polymeric release agents having carboxy, hydroxy, epoxy, amino, isocyanate, thioether and mercapto functionality, while U.S. Pat. No. 5,157,445 is primarily directed to release agents having amino functionality.

According to the disclosed fusing methods, the toner release agents employed can be applied to the fuser roller by several delivery mechanisms including wicking, impregnating webs, and also by way of a so-called release agent donor roller. The donor roller may comprise a core of EPDM elastomer (a terpolymer of ethylene, propylene and diene monomers) with a thin surface layer thereover of polytetrafluoroethylene, such as Teflon® fluorocarbon resin available from Dupont, which is applied as an independent extruded thin sleeve bonded to said core.

Donor rollers comprised of a polytetrafluoroethylene sleeve bonded to an EPDM core are relatively expensive to make, and the manufacture of such a donor roll is tedious and inefficient, with the yield being relatively low since many of such sleeves are damaged during manufacture. Furthermore, in a fusing system such as that illustrated in FIG. 1 described hereinafter, such a sleeved release agent donor roller is largely ineffective in that since the release agent donor roller is driven by frictional engagement with the associated, positively-driven fuser roller, the hard, polytetrafluoroethylene surface coating of the donor roller with its relatively low coefficient of friction is not always adequately driven by the fuser roller.

Another technique used has been a donor roller having a surface layer including a HTV silicone elastomer material, such as that disclosed in U.S. Pat. No. 4,659,621. This patent discloses a release agent donor roller with a conformable donor surface thereon and consisting of a crosslinked addition curable vinyl terminated or vinyl pendant polyorganosiloxane. The patentees disclose that the HVT silicone elastomer surface of their donor roller exhibits a relatively low release agent swell rate over a relatively long period of time, with swell rates of generally less than 10 wt % being exemplified for examples said to correspond to the invention. While such silicone elastomer type donor rollers have been employed in some commercial applications, they still have a tendency to contaminate with toner resin due to offset, and this contamination problem is particularly a problem for toners which employ relatively low melting toner resin binders, such as polyester resins, currently used for process color printing or reproduction, and also for high speed printing or reproduction machines, such as speeds of greater than about 50 pages per minute and preferably greater than 100 pages per minute.

U.S. Pat. No. 6,190,771 B1 similarly discloses a relatively low swelling poly(organosiloxane) coated donor roller wherein the donor roller surface is a crosslinked, condensation polymerized poly(organosiloxane). While this donor roller can exhibit acceptable performance, due to its low swelling characteristic, it may also show a tendency to contaminate with toners that employ a relatively low melting polymer binder.

U.S. Pat. No. 5,061,965 describes a release agent donor roller made of a base roller, an intermediate comformable silicone elastomer layer, and a fluoroelastomer release layer thereover comprising a poly(vinylidenefluoride-co-hexafluoropropylene-co-tetrafluoroethylene) polymer and a metal oxide to interact with a functionalized polymeric release agent. While use of a fluoroelastomer surface with a functionalized release agent may minimize offset and contamination of the fuser system, such donor roller surface is susceptible to contamination anyway in the event of a failure in supply or distribution of the release agent itself, and it is also dependent on the ability of the release agent to wet the surface of the fluoroelastomer layer.

U.S. Pat. Nos. 5,141,788 and 5,166,031 disclose fuser members having an outer surface of a surface-grafted or volume-grafted hybrid of a fluoroelastomer and poly (organosiloxane), wherein said grafting is formed by dehydrofluorination of said fluoroelastomer by a nucleophilic dehydrofluorinating agent, followed by polymerization of an alkyl, alkene or alkyne functionalized poly(organosiloxane) with suitable polymerization initiators.

U.S. Pat. Nos. 6,067,438 and 6,075,966 disclose donor roller members with outer layers comprised of an interpenetrating network of fluorocarbon elastomer and poly (organosiloxane) polymers. Although donor rollers made using the materials disclosed in the foregoing patents may provide long life, they are also relatively more complex to manufacture and expensive to produce, and they are also essentially non-swelling with respect to the release agent, and thus, are susceptible to contamination anyway in the event of any failure in supply or distribution of the release agent itself, particularly where low melting point polymer toner binders are used.

As can be seen, it would be desirable to develop a donor roller which is relatively easy to manufacture and which is also not as dependent on the supply and/or distribution of release agent, but is resistant to contamination caused by offset of toner during fusing of images to a receiver, particularly for fusing of toners prepared with relatively low melting point resin binders.

SUMMARY OF THE INVENTION

The foregoing objects and advantages are achieved in one aspect by a release agent donor roller as described hereinafter for applying a polymeric release agent to a fuser roller in an electrophotographic apparatus. The donor roller comprises a base member with an outer polymeric layer thereover comprising a silicone material with a swelling in 300 cts poly(dimethylsiloxane) oil maintained at a temperature of 175° C. after 24 hours of greater than 15% by weight.

In another aspect, the invention also relates to a fusing system for fusing toner to a receiver in an electrophotographic apparatus. The fusing system comprises:

(a) a fuser roller having an exterior surface and a pressure roller opposing said fuser roller and adapted to form a toning nip;

(b) a reservoir for holding a polymeric release agent;

(c) a metering roller adapted to receive a flow of the polymeric release agent from the reservoir; and (d) a release agent donor roller for receiving the polymeric release agent from the metering roller and applying the polymeric release agent to the exterior surface of the fusing roller, the release agent donor roller comprising an outer layer of a silicone material with a swelling in 300 cts amine-functionalized poly (dimethylsiloxane) oil maintained at a temperature of 175° C. after 24 hours of greater than 15% by weight.

In another aspect, the invention relates to a method for fusing a toner material comprised of a thermoplastic resin binder to a substrate. The method comprises:

forming a film of a release agent on the surface of a heated fuser member by contact of said fuser member with a release agent donor roller, the release agent donor roller comprising an outer layer of a silicone material with a swelling in 300 cts poly(dimethylsiloxane) oil maintained at a temperature of 175° C. after 24 hours of greater than 15% by weight;

contacting the toner material on the substrate with the heated fuser member for a time sufficient to soften the toner material, and allowing the toner material to cool.

In embodiments, the silicone material employed for the donor roller outer layer comprises a polymerized reaction product of:

(a) at least one cross-linkable poly(dialkylsiloxane);

(b) at least one cross-linking agent in an amount sufficient to yield a silicone material with a swelling in 300 cts poly(dimethylsiloxane) oil maintained at a temperature of 175° C. after 24 hours of greater than 15% by weight;

(c) a minor amount of at least one particulate filler; and (d) a cross-linking catalyst in an amount effective to react the poly(dialkylsiloxane) with the cross-linking agent.

In preferred embodiments, the silicone material comprises an addition polymerized reaction product of:

(a) at least one cross-linkable, vinyl-substituted poly (dialkylsiloxane) with a weight-average molecular weight before cross-linking of about 1,000 to about 90,000;

(b) from about 1 to less than 5 parts by weight per 100 parts of poly (diaklysiloxane) of finely divided filler; and (c) at least one cross-linking agent comprising a multi-functional organo-hydrosiloxane having hydride functional groups capable of reacting with the vinyl functional groups of the poly(dialkylsiloxane); and (d) at least one cross-linking catalyst present in an amount sufficient to induce addition polymerization of the poly(dialkylsiloxane) with the multifunctional organo-hydrosiloxane cross-linking agent.

An advantage of the present invention is that increasing the swell of the donor roller outer layer, such that swell is preferably controlled within a range as described hereinafter, will reduce toner offset, as well as maintain the mechanical properties of the release agent donor roller outer layer.

Another advantage of the present invention is that by increasing the oil swell of the donor roller outer layer through modifications to the chemical structure of the outer layer as described hereinafter, the outer layer can exhibit a lower coefficient of friction, thereby improving wear resistance and resulting in a longer useful roller life.

DETAILED DESCRIPTION OF THE PREFERRED EMBODIMENTS

Figure 1:
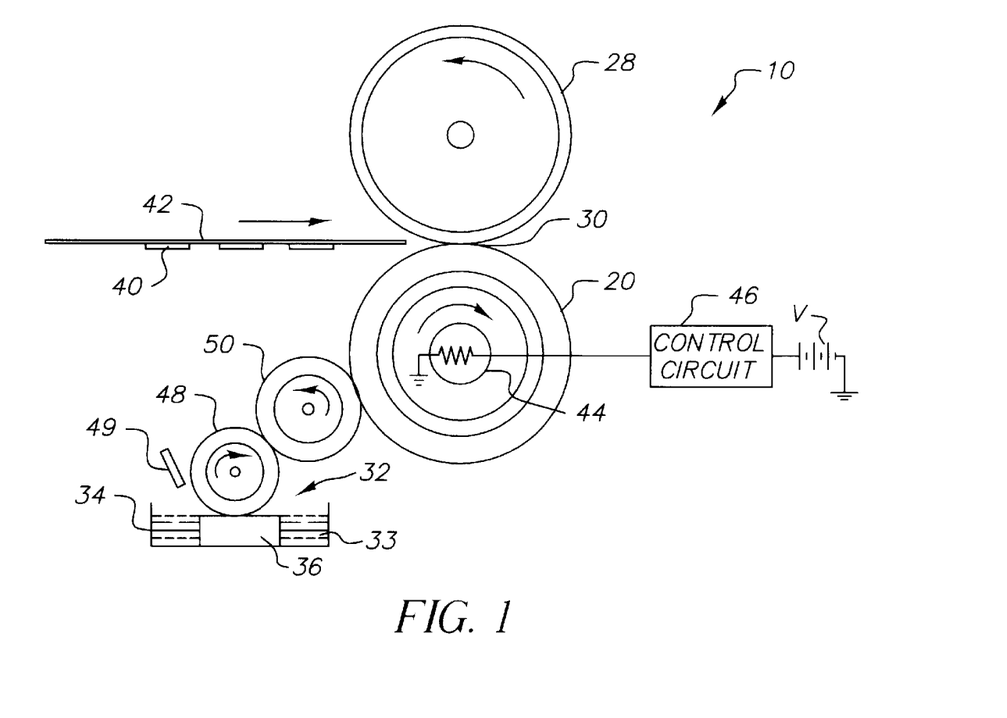
FIG. 1 is a schematic, front, cross-sectional view of a fuser system in accordance with an embodiment of the present invention.

Referring now to FIG. 1 a fuser system 10 according to an embodiment of the invention is shown which includes a fuser roller 20 and an elastomeric pressure roller 28 which form a toning nip 30. A supply of polymeric release agent 33 is shown provided in a polymeric release agent reservoir 34. The fuser roller 20 can be made of any material known to the art and which employs an outer surface comprised of a material which uses or can use a polymeric release agent as described hereinafter. Generally, the outer surfaces of the fuser roller 20 and pressure roller 28 comprise an elastomeric material, such as silicone elastomers, fluoroelastomers, and so-called interpenetrating networks of silicone and fluoroelastomers. Such materials are disclosed, for example, in the U.S. Patents previously incorporated herein by reference, as well as U.S. Pat. Nos. 5,141,788; 5,166,031; 5,281,506; 5,366,772; 5,370,931; 5,480,938; 5,846,643; 5,918,098; 6,037,092; 6,099,673; and 6,159,588, the teachings of which are also incorporated herein by reference. Another type of suitable material is a fluorocarbon-based, curable, thermoplastic random copolymer material, which in preferred embodiments utilize so-called THV thermoplastic fluoropolymers, such as those polymer materials disclosed in U.S. Patent Application entitled "FLUOROCARBON THERMOPLASTIC RANDOM COPOLYMER COMPOSITION", U.S. Ser. No. 09/609,561, filed Jun. 30, 2000, the teachings of which are also incorporated herein by reference in their entirety.

Referring again to FIG. 1, particulate imaging material 40, such as toner, disposed on a receiver 42 is fused into the receiver 42 at the toning nip 30 by the application of heat and pressure. As shown, a heating lamp 44 is connected to a control circuit 46. The heating lamp 44, as known to those skilled in the art, may be provided inside the core of the fuser roller 20 as shown in FIG. 1. The fuser roller 20 can also be externally heated by a heated roller (not shown) which is opposed to and can ride along in frictional contact with the fuser roller 20. This external heat source may replace or merely assist the internal lamp 44. It should be understood, however, that depending on the particulate imaging material 40 used, in some cases only pressure may need to be applied to fuse particulate imaging material 40 into the receiver 42.

A wicking decive 32 shown in FIG. 1 in a form comprised of a wick 36, absorbs polymeric release agent 33 contained within reservoir 34. The wick 36 conveys the polymeric release agent 33 from reservoir 34 by wicking action to a metering roller 48 which contacts or is otherwise placed in close proximity to wick 36. Due to the rotational action (as shown by the arrow within metering roller 48 in FIG. 1) of metering roller 48, such contact with wick 36 draws a thin film of the polymeric release agent 33 onto the exterior surface of metering roller 48. A metering blade 49 is positioned above the polymeric release agent level in reservoir 34 and adjacent to metering roller 48 such that the amount of polymeric release agent applied and thickness of the film can be controlled to desired levels. The metering roller 48 can be positively driven, but is more conveniently driven by frictional contact with a release agent donor roller 50 as described hereinafter.

Disposed in an opposed, contacting relationship and intermediate position between the fuser roller 20 and the metering roller 48 is a release agent donor roller 50. The release agent donor roller 50, due to rotational action (as shown by the arrow within donor roller 50 in FIG. 1) and contact with metering roller 48, receives the polymeric release agent 33 from metering roller 48 and delivers the polymeric release agent as a thin film to the outer surface of the fuser roller 20. Fuser roller 20 due to rotational action (as shown by the arrow within fuser roller 20 in FIG. 1) thereafter delivers the polymeric release agent to toning nip 30, such that the presence of the polymeric release agent on the surface of the fuser roller 20 thereby acts to prevent or at least substantially reduce offset of particulate imaging material 40 on receiver 42. A continuous supply of polymeric release agent 33 is provided, which is applied by the fuser roller 20 in an effective amount of from about 1 to about 20 milligrams per receiver 42, on which particulate imaging material 40 is fixed. This polymeric release agent 33 is discussed further hereinafter.

Figure 2:
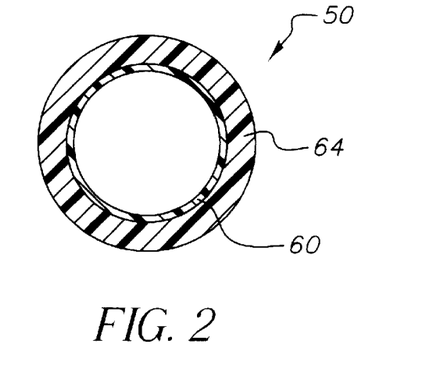
FIG. 2 is a cross-sectional view of the release agent donor roller shown in FIG. 1.

Referring now to FIG. 2, the release agent donor roller 50 comprises a base member 60 which is generally in the form of a solid or hollow cylindrical shaft of any convenient diameter, typically from about 8 millimeters to 22 millimeters in diameter. Disposed on the base member 60 is a polymeric outer layer 64, which layer can have a thickness that varies, but is preferably from about 3 about to about 6 millimeters thick. The outer layer 64, can be thicker than the foregoing range if desired to adjust for characteristics of toning nip 30. Typically the donor roller 50 is from about 12 to 18 inches in length. The donor roller 50 can be positively driven, but is conveniently driven by frictional contact with fuser roller 20.

The release agent donor roller 50 is typically in the configuration of an economical, highly reliable, long life cylindrical roller which is preferably conformable with a fuser roller 20 and provides substantially uniform delivery of an effective amount of polymeric release agent 33 as previously described. The polymeric release agents employed with the fusing system can be any of those known to the art, such as those referenced in the U.S. Patents previously incorporated herein by reference. Preferably, the polymeric release agent 33 is a poly(siloxane) oil, most preferably a poly(dialkylsiloxane), and most preferably a poly(dimethylsiloxane) oil. Such poly(organosiloxane) oils can generally have a viscosity of from about 10 to about 200,000 centistokes (cts), and preferably, have a viscosity of from about 200 to about 60,000 cts as measured with a Brookfield viscometer at 25° C. The poly(organosiloxane) oil in preferred embodiments, also has functional groups in either a terminal position on the siloxane polymer chain, or pendant to such siloxane chain, or both, such as those polymeric release agents disclosed in U.S. Pat. Nos. 4,029,827; 4,101,686; 4,185,140; and 5,157,445 previously incorporated by reference, which groups can interact with the outer surface of the fuser roller 20 such that a thin film of the polymeric release agent is formed on the surface of such fuser roller. In preferred embodiments, the poly (organosiloxane) oil has functional groups, including carboxy, hydroxy, epoxy, isocyanate, thioether, hydride, amino, or mercapto groups, and more preferably hydride, amino or mercapto groups, to provide an interfacial barrier layer between the fusing surface and toner 40 on receiver 42. Blends of such poly(organosiloxane) oils may also be used.

In accordance with the present invention, and referring now to FIG. 2 as well, a long life, controlled polymeric release agent donor roller 50 and a fusing system 10 of the type wherein a nonfunctional or a functional polymeric release agent 33 is applied to the surface of a fuser roller 20 is provided by a controlled, relatively-high swelling, release agent donor roller 50. The controlled release agent donor roller 50 comprises a base member 60 and an outer layer 64 disposed over the base member 60. While not shown in FIG. 2, other layers as known to the art, such as a polymeric base cushion layer, can be disposed between the outer layer 64 and base member 60.

The release agent donor roller outer layer 64 is formed by curing at least one poly(organosiloxane) such that a siloxane material is obtained with certain swelling characteristics in the release agent; in other words, the silicone material is selected such that a majority of any swelling occurs within 24 hours of being exposed to such oil. Suitable siloxane materials are those with a swelling in 300 cts poly (dimethylsiloxane) oil maintained at a temperature of 175° C. after 24 hours of greater than 15% by weight. Preferably, the swell of the silicone material in such oil does not exceed about 30% by weight, and more preferably the swell does not exceed about 25% by weight, when such siloxane material is placed in 300 cts poly(dimethylsiloxane) oil maintained at 175° C. after 7 days. It should be understood that the viscosity of the oil employed in such swell test, i.e., the 300 cts value, is measured with a well-known Brookfield viscometer (obtainable from Brookfield Engineering Lab, Inc. of Stoughton, Mass.) at a temperature of 25° C. Also, the ratio of (i) the swell of the silicone material in the 300 cts poly(dimethylsiloxane) oil at 175° C. after 24 hours of exposure to (ii) the swell of the silicone material in the 300 cts poly(dimethylsiloxane) oil at 175° C. after 7 days of exposure, is at least about 0.50, and more preferably is at least about 0.60, and even more preferably at least about 0.70. A preferred poly(dimethylsiloxane) oil for such swell test is an amine-functionalized poly(dimethylsiloxane) oil, Wacker 87087, obtained from Wacker Silicones Corporation of Adrian, Mich.

In general, the silicone material employed for the outer layer 64 of the donor roller 50 comprises a polymerized reaction product of:

(a) at least one cross-linkable poly(dialkylsiloxane);

(b) at least one cross-linking agent in an amount sufficient to provide the swell characteristics previously described;

(c) a minor amount of at least one particulate filler; and (d) a cross-linking catalyst in an amount effective to react the poly(dialkylsiloxane) with the cross-linking agent.

The polymerization may be a condensation-type reaction of hydroxy-substituted polysiloxanes, or addition polymerized reaction of vinyl-substituted polysiloxanes with hydride-substituted cross-linking agents, as known generally to those in the art. Both types of polymerizations are described hereinafter. Addition polymerization is preferred due to manufacturing and other processing advantages.

According to the invention herein, there are two methods for adjusting the swell caused by the polymeric release agent.

The first method concerns the amount of inert filler added to the silicone material. The mechanism involved is simply the displacement of polymer from the resulting cured silicone material, resulting in less polymer to swell and thereby a reduced polymer to swell relationship. The disadvantage of this approach is that the filler does not generally provide a good release surface for toner, which can lead to contamination of the roller and offset; however, relatively minor amounts of filler are employed in the present invention. According to the present invention, it is preferred to maintain the amount of filler employed at relatively low levels, preferably less than 5 parts per 100 parts of poly(dialkylsiloxane) employed, and more preferably from about 1 part to about 4 parts of filler per 100 parts of the poly(dialkylsiloxane) polymer. At least about 1 part filler per 100 parts of poly(dialkylsiloxane) is employed to impart mechanical stability.

The second, and a preferred method, is to adjust the swell characteristics of the resulting cross-linked poly(dialkylsiloxane) polymer by affecting its cross-link density. In general, cross-link density can be adjusted by varying the amount of cross-linking agent used to obtain the crosslinked poly(dialkylsiloxane) reaction product, which also results in a corresponding change to the molecular weight of the polymer. In general, a higher molecular weight poly(dialkylsiloxane) polymer will exhibit a higher swell in the poly(dimethylsiloxane) oil test as previously described. As a result, it is preferred to use a cross linkable poly(dialkylsiloxane) polymer which, before crosslinking, has a weight average molecular weight of preferably from about 10,000 to 90,000.

As mentioned above, in preferred embodiments, the outer layer 64 comprises an addition polymerized reaction product. In this embodiment, the outer layer comprises the addition polymerized reaction product of:

(a) at least one cross-linkable, poly(dialkylsiloxane), wherein the poly(dialkylsiloxane) is preferably a vinyl-substituted poly ($C_{1-8}$ alkylsiloxane) with terminal and/or pendant vinyl group functionality and a weight-average molecular weight before cross-linking of about 1,000 to about 90,000;

(b) from about 1 to less than 5 parts by weight per 100 parts of poly (diaklysiloxane) of finely divided filler;

(c) at least one cross-linking agent comprising a multifunctional organo-hydrosiloxane having hydride functional groups (Si—H) capable of reacting with the vinyl functional groups of the poly(dialkylsiloxane); and (d) at least one cross-linking catalyst present in an amount sufficient to induce addition polymerization of the poly(dialkylsiloxane) with the organo-hydrosiloxane cross-linking agent.

The addition-crosslinked poly(dialkylsiloxane) can be formed by addition polymerization of vinyl-substituted multifunctional siloxane polymers with multifunctional organo-hydrosiloxanes, as is generally described in U.S. Pat. Nos. 5,587,245 and 6,020,038, the teachings of which are incorporated herein by reference. Vinyl-substituted multifunctional siloxane polymers and their preparation are known and, as used in the present invention, preferably have at least one of the following repeating subunits:

and terminal subunits having the general structure:

Designations, such as Z', R, and L, in all structural formulas herein; are used in a uniform manner and have the following meanings:

R is an alkyl having from 1 to 8 carbon atoms. More preferred are alkyl groups having from 1 to 6 carbons. Specific examples of R groups include: methyl, ethyl, propyl, and butyl, with methyl being most preferred. R groups can be substituted, however, the substituents should not degrade the characteristics of the resulting polymer. For example, R groups that react with olefins or organo-hydrosiloxanes are undesirable. Although minor amounts of aryl functionality can be incorporated into the polymer, it is generally not desirable to add a significant amount of aryl functionality into the poly(dialkylsiloxane) polymer, as the aryl functionality can inhibit the swelling of release agent.

Z is an olefinic group having from 2 to 8 carbons and a terminal vinyl moiety. Specific examples of Z groups include vinyl and allyl.

Z' represents Z or R, provided that each molecule of vinyl-substituted multifunctional siloxane polymer has two or more Z moieties (and thus 2 or more terminal vinyl groups).

L is —O— or —$(CH_2)_e$—, where e is an integer from 1 to about 8.

The vinyl-substituted multifunctional siloxane polymers can be represented, at least in so far as the currently preferred embodiments of the invention, by the general structure (referred to herein as "structure I"):

(I)

Each repeating subunit that has one or more L moieties (also referred to herein as branching subunits) which represents a branch point. Branches may extend outward in the form of a dendrite or star, or may form crosslinks to other to chains. The value of p, the number of terminal units on branches, is equal to of less than the total number of branching units, j+k, and may be as low as zero if all branching subunits form crosslinks.

The extent of branching or cross-linking of the siloxane polymer is low, since the resulting elastomer would otherwise be excessively hard. If n+m+j+k is defined as being equal to 100 mole percent; then j+k is less than 5 mole percent, and preferably is from 2 mole percent to 0 mole percent. The latter represents a preferred siloxane polymer, in which branching subunits are completely or substantially excluded. For this polymer, structure I can be simplified to the following (structure II):

(II)

The siloxane polymer has at least two olefinic functionalities (in structures I or II; Z, or Z', or a combination of Z and Z'). The percentage of silicon atoms substituted by an olefinic moiety can be higher than two, but must be low enough to prevent the resulting elastomer from being excessively hard due to extensive crosslinking. It is preferred that the percentage of silicon atoms substituted by an olefinic moiety is less than about 3 percent of the total number of silicon atoms; or, more preferably, less than about 2 percent of the total number of silicon atoms.

In embodiments of the invention, the value of m is 0 or 1 and Z' is olefinic. In one such embodiment, structure II can be simplified as (structure III):

(III)

In other embodiments of the invention, Z' is R. In one such embodiment, structure II can be simplified as (structure IV):

(IV)

In particular embodiments of the invention, Z or Z' groups each have the general structure:

where d is an integer from 0 to about 6 and preferably from 0 to about 3. In one such embodiment, the siloxane polymer has the general structure (structure V):

(V)

A specific example of such a preferred poly(dialkylsiloxane) polymer is a vinyldimethyl terminated polydimethylsiloxane, which has the general structure:

and a weight-average molecular weight of about 1,000 to about 90,000. These materials are commercially available from United Chemical Technologies, Inc., Piscataway, N.J., under various designations depending upon the viscosity and molecular weight desired.

In another embodiment, the siloxane polymer has the general structure (structure VI):

(VI)

The designations n, m, and d have the same meanings as given above. A specific example of such a siloxane polymer is vinylmethyl siloxane copolymers in which each R is methyl.

In the structural formulas above, the values of n, or n+m, or n+m+j+k, are integers such that the respective polymer has a weight average molecular weight between vinyl groups of from 1,000 to 90,000. If the molecular weight between vinyl groups is above 90,000, the final crosslinked polymer would be too unstable under conditions of high temperature and cyclic stress (i.e., there would be too much creep and change in hardness over time), even when filler is dispersed therein in accordance with the invention. If the molecular weight between vinyl groups is below 1,000, the final cross-linked elastomer would have too high of a crosslink density that would make the material too hard and brittle.

In embodiments, the multifunctional organo-hydrosiloxanes that can serve as cross-linking agents for the structure I polymers have the general structure (structure VII):

(VII)

Each T represents:

or both T's together represent atoms completing an organo-hydrosiloxane ring, such that structure VII can be rewritten as:

$R^a$ represents the same groups as R, i.e., $R^a$ can be alkyl having from 1 to 8 carbon substituents. Specific examples of $R^a$ groups include: methyl, ethyl, propyl, and butyl. $R^b$ represents H or $R^a$. At least two $R^b$ moieties are H. It is preferred that $R^a$ be methyl and that T be trimethylsilyl. The value of q is preferably from 3 to about 300. A specific example of a suitable multifunctional organo-hydrosiloxane is a material marketed as PS123, by United Chemical Technologies, Piscataway, N.J. This material has the general structure:

where $q^1+q^2=q$, and has a weight average molecular weight of from about 2,000 to 2,500. Another example is 1,3,5,7-tetramethylcyclotetrasiloxane, also available from United Chemical Technologies.

The addition cross-linking reaction is carried out with the aid of a late transition metal catalyst as known to the art, such as cobalt, rhodium, nickel, palladium or platinum catalysts. Specific examples of such catalysts include chlorotris(triphenylphosphine) rhodium(I), $RhCl(Ph_3P)_3$; dicobaltoctacarbonyl, $Co_2(CO)_8$; and chloroplatinic acid, $H_2PtCl_6$. Chloroplatinic acid is preferred. In a particular embodiment of the invention, the catalyst is added as a complex with vinyl-terminated polysiloxane. Currently preferred is a platinum catalyst complex sold commercially as PC075 by United Chemical Technologies. This material is a complex of chloroplatinic acid and cyclovinylmethyl siloxane and has a platinum concentration of 2 to 3.5 percent by weight based on total weight of the mixture to be cured. It is also preferred that the PC075 complex be diluted with vinyl-terminated dimethylsiloxane polymer to provide a final platinum concentration of from 0.1 to 1000 parts per million (ppm), depending upon the desired cure rate. A suitable polysiloxane diluent is marketed by United Chemical Technologies as PS441.2 (viscosity=200 cts).

In preferred embodiments, the release agent donor roller outer layer 64 comprises the crosslinked, addition-polymerized reaction product of a vinyl-terminated poly (dialkylsiloxane) and hydride-functional (Si—H) poly (dimethylsiloxane), provided that the molar ratio of vinyl to Si—H functional groups is from about 0.5:1 to about 5:1. The reaction is preferably conducted in the presence of a platinum curing catalyst with a weight ratio of platinum catalyst to poly(dialkylsiloxane) of from about $1\times10^{-3}$ to 1 to about $1\times10^{-6}$ to 1.

The filler can be selected from inorganic metal oxides, such as aluminum oxide, iron oxide, tin oxide, zinc oxide, copper oxide and nickel oxide. Silica (silicon dioxide) can also be used. The particle size of the filler does not appear to be critical. Particle sizes anywhere in the range of 0.1 to 100 micrometers are acceptable. The amount of filler employed is described hereinabove. The filler particles are mixed with the starting polymer and multifunctional organo-hydrosiloxane cross-linking agent prior to curing the mixture on base member 60.

A preferred commercially available material for forming a crosslinked, addition-polymerized, polyorganosiloxane is GE RTV862 silicone rubber available from GE Silicones, Waterford, N.Y. or S5100 silicone rubber available from Emerson Cumming Silicones Division of W. R. Grace and Co. of Lexington, Mass.

Although less preferred, condensation-type polysiloxanes can be used to form outer layer 64. In this embodiment, the outer layer comprises the condensation polymerized reaction product of:

(a) at least one cross-linkable, poly(dialkylsiloxane) wherein the poly(dialkylsiloxane) is preferably a hydroxy-substituted poly($C_{1-8}$ alkylsiloxane) with terminal and/or pendant hydroxyl group functionality and a weight-average molecular weight before cross-linking of about 1,000 to about 90,000;

(b) from about 1 to less than 5 parts by weight per 100 parts of the poly (diaklysiloxane) of finely divided filler;

(c) at least one multifunctional silane cross-linking agent having functional groups capable of condensing with the hydroxyl functional groups of the poly (dialkylsiloxane); and (d) at least one cross-linking catalyst present in an amount sufficient to induce condensation polymerization of the poly(dialkylsiloxane) with the multifunctional silane cross-linking agent.

Examples of preferred materials for use as a poly (dialkylsiloxane), are condensable poly(dimethylsiloxanes) and fillers such as those disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,548,720 (tin oxide filler), and U.S. Pat. No. 5,336,539 (nickel oxide), the teachings of which are incorporated herein by reference.

Silanol-terminated poly(dialkylsiloxane) polymers and methods of their preparation are known and generally have the repeat unit structure (structure VIII):

(VIII)

For purposes of the present invention, n is an integer such that the siloxane polymer has a weight average molecular weight before cross-linking of from about 1,000 to about 90,000. $R^1$ and $R^2$ are independently $C_{1-8}$ alkyl groups, such as methyl, ethyl, propyl, butyl, pentyl, and hexyl, and more preferably $R^1$ and $R^2$ are $C_{1-6}$ alkyls. $R^1$ and $R^2$ are more preferably methyl groups. If the molecular weight is below about 1,000, the final cross-linked network would have a high crosslink density that would make the material too hard and brittle, and not conformable, i.e., resilient, enough to be practical for use in fusing systems.

Silanol-terminated poly(dialkylsiloxanes) are also commercially available from United Chemical Technologies, Inc. of Piscataway, N.J.

The silanol-terminated poly(dialkylsiloxane) polymer can be cross-linked with multifunctional silanes. The multifunctional silanes that can serve as cross-linking agents for the structure VII polymers are well known for this purpose. Each of such silanes comprises a silicon atom bonded to at least three groups that are functional to condense with the hydroxyl groups of the structure (VIII) polymers to thereby create siloxane crosslinks with the silicon atom of the multifunctional silane. The functional groups of the silanes can be, for example, acyloxy (R—COO—), alkenoxy ($CH_2$=C(R)O—), alkoxy (R—O—), dialkylamino ($R_2$N—), or alkyliminoxy ($R_2$C=N—O—) groups, wherein R represents a $C_{1-12}$ alkyl group, preferably a $C_{1-6}$ alkyl. Some specific examples of suitable multifunctional silane cross-linking agents are methyltrimethoxysilane, tetraethoxysilane, methyltripropenoxysilane, methyltriacetoxysilane, methyltris(butanone oxime)silane, and methyltris(diethylamino)silane.

The condensation reaction is carried out with the aid of a catalyst, such as, for example, a titanate, chloride, oxide, or carboxylic acid salt of zinc, tin, iron, or lead. Specific examples of useful condensation catalysts are dibutyltin diacetate, tin octoate, zinc octoate, dibutyltin dichloride, dibutyltin dibutoxide, ferric chloride, lead dioxide, or mixtures of catalysts such as CAT50® catalyst sold by Grace Specialty Polymers of Lexington, Mass. CAT50® catalyst is believed to be a mixture of dibutyltin dibutoxide and dibutyltin dichloride diluted with butanol.

Suitable fillers include those as previously described herein.

To form the release agent donor roller outer layer 64 of a fuser system 10 in accordance with the invention, at least one poly(dialkylsiloxane), a stoichiometric excess amount of multifunctional silane to form crosslinks with the hydroxy or vinyl end groups of the poly(dialkylsiloxane), and an appropriate amount of filler as previously described are thoroughly mixed by any suitable method, such as with a three-roll mill as known to the art. The mixture is then degassed and injected into a mold surrounding the base member, e.g. roll, or core to mold the material onto the core according to injection molding methods well known in the art. The so-treated core is kept in the mold for a time sufficient for some cross-linking to occur (e.g., generally at least about 4 hours) and allow the core to be removed from the mold without damage thereto. The so-coated roller is then removed from the mold and maintained at a temperature of from about 25 to about 100° C. for at least about 1 hour so as to substantially complete reaction and/or accelerate remaining cross-linking.

The outer layer 64 can have a thickness that varies depending on the overall size of the fuser roller employed in the fusing system, but is preferably from about 0.0125 millimeters to about 7.5 millimeters thick, and more preferably from about 3 to about 6 millimeters thick.

The outer layer 64 of release agent donor roller 50 desirably has a hardness of greater than 20 Shore A, and is preferably from about 30 to about 40 Shore A as determined by accepted analytical methods known in the art, i.e., ASTM Standard D2240, as mentioned in U.S. Pat. No. 5,716,714, the relevant teachings of which are incorporated herein by reference.

The following Examples further define and describe donor rolls prepared according to the present invention and are merely intended to illustrate specific embodiments of the present invention and should not be construed as limiting the scope thereof. Unless otherwise indicated, all parts and percentages are by weight and temperatures are in degrees Celsius (° C.).

SPECIFIC EMBODIMENTS OF THE INVENTION

EXAMPLE 1

Preparation of Controlled Swell Silicone Material

A silicone mixture is prepared by mixing in a three roll mill 100 parts of GE 862 A RTV silicone rubber base compound (a crosslinked poly(dimethylsiloxane) with 10 parts of GE 862 B RTV silicone rubber curing agent, both obtainable from GE Silicones of Waterford, N.Y.

The GE 862 A base compound contains a poly(dimethylsiloxane) polymer with an effective amount, i.e., believed to be from about 10 to 100 ppm, of platinum as a catalyst therein to initiate addition polymerization with a hydride-terminated siloxane polymer cross-linking agent in the GE 862 B curing agent, and also 3 parts silica as filler per 100 parts of the GE 862 A and GE 862 B employed.

The GE 862 B curing agent contains a vinyl-terminated poly(dimethylsiloxane) and a slight molar excess of hydride-terminated poly(dimethylsiloxane) to substantially react with the vinyl groups of the poly(dimethylsiloxane) in both the GE 862 A base compound and GE 862 B curing agent.

The mixture is then degassed and molded into the shape of a 90 mil×6 inch×6 inch slab. The slab is then initially cured for 12 hours at 25° C. such that the siloxane material can be removed from the mold without structural damage and removed therefrom. The slab is thereafter cured in an oven by increasing the temperature in said oven with a 0.5 hour ramp to 80° C. followed by an 1 hour hold at 80° C. to substantially complete cross-linking of the silicone material. The slab is then subjected to testing as described hereinafter.

EXAMPLE 2

Preparation of Release Agent Donor Roller

A cylindrical aluminum core is initially cleaned with dichloromethane and dried. The outer surface of the core is then primed with a uniform coat of a metal alkoxide primer, i.e., Dow 1200™ prime coat primer marketed by Dow Corning Corporation of Midland, Mich. which contains: light aliphatic petroleum naptha (85 weight percent), tetra (2-methoxyethoxy)-silane (5 weight percent), tetrapropyl orthosilicate (5 weight percent), and tetrabutyl titanate (5 weight percent). The core is then air dried.

The procedure of Example 1 is substantially repeated to obtain the silicone mixture prior to cure. The silicone mixture is then degassed and injection molded into a mold according to conventional injection molding methods and the mold is maintained at room temperature, i.e. a temperature of 25° C., for 24 hours. The core is then removed from the mold and placed in an oven wherein the temperature therein is ramped to 80° C. over a period of 30 minutes, followed by an 1 hour hold at 80° C. to substantially complete cross-linking of the silicone mixture. The resulting donor roller has a poly(dimethylsiloxane) outer layer with a dried thickness of 0.230 inches. The so-coated donor roller is then subjected to testing as described hereinafter.

EXAMPLE 3

The procedure of Example 1 is substantially repeated except that, 100 parts of the base compound GE862 A is mixed with 5 parts of the curing agent GE 862 B, i.e., a 20 to 1 ratio by weight. The resulting slab is then subjected to testing as described hereinafter.

EXAMPLE 4

The procedure of Example 2 is substantially repeated, except that the silicone mixture prepared as in Example 3 (with a 20:1 weight ratio of GE 862 A base compound to GE 862 B curing agent) is used to injection mold an outer layer onto the aluminum core and prepare the donor roller. The resulting donor roller has a poly(dimethylsiloxane) outer layer with a dried thickness of 0.230 inches. The roller is then subjected to testing as described hereinafter.

EXAMPLE 5

The procedure of Example 1 is substantially repeated, except that the silicone mixture is prepared by mixing 100 parts of RTV S5100 A (a crosslinked poly(dimethylsiloxane) base compound with 100 parts of RTV S5100B curing agent, both obtainable from Emerson Cumming Silicones Division of W. R. Grace and Co. of Lexington, Mass.

The S5100 A base compound contains a vinyl-terminated poly(dimethylsiloxane) polymer with an effective amount, i.e., believed to be 10 to 100 ppm, of platinum as catalyst therein to initiate addition polymerization with a hydride-terminated siloxane polymer in the S5100 B curing agent, and also about 3 wt % of silica as filler per 100 parts of S 5100 A and S5100 B employed. The cross-linking agent is a hydride-terminated siloxane.

The S5100 B curing agent contains a vinyl-terminated poly(dimethylsiloxane) and a slight molar excess of hydride-terminated poly(dimethylsiloxane) to substantially react with the vinyl groups of the poly(dimethylsiloxane) in both the S5100 A base compound and S5100 B curing agent.

The slab is subjected to testing as described hereinafter.

EXAMPLE 6

The procedure of Example 2 is substantially repeated, except that the silicone mixture prepared as in Example 5 (100 parts of S5100 A base compound and 100 parts of S5100 B curing agent) is used to injection mold an outer layer onto the aluminum core and prepare the donor roller. The resulting donor roller has a poly(dimethylsiloxane) outer layer with a dried thickness of 0.230 inches. The roller is then subjected to testing as described hereinafter.

COMPARATIVE EXAMPLE 1

A release agent donor roller is prepared from an aluminum core with an outer layer of a cured fluorocarbon thermoplastic random copolymer composition thereon prepared substantially as described in U.S. patent application Ser. No. 09/609,561, filed Jun. 30, 2000, and entitled "FLUOROCARBON THERMOPLASTIC RANDOM COPOLYMER COMPOSITION", (Attorney Docket No. 81295), the teachings of which are incorporated herein by reference, and as described more fully hereinafter.

The aluminum core is initially cleaned with dichloromethane and dried. The core is then primed with the Dow 1200 RTV Prime Coat primer referenced in Example 2 above.

A fluoropolymer mixture is prepared by mixing 100 parts of a fluorocarbon thermoplastic random copolymer—THV 200A, with 6 parts of zinc oxide, 14 parts of a commercially-available aminosiloxane mixture, and 36 parts of a fluoro-ethylenepropylene (FEP) resin in a two-roll mill. The THV200A is a commercially available fluorocarbon thermoplastic random copolymer sold by 3M Corporation of St. Paul, Minn. The zinc oxide in particulate form is obtained from any convenient commercial source, e.g., Atlantic Equipment Engineers of Bergenfield, N.J. The amino siloxane is DMS-A21 commercially available from Gelest, Inc. of Tullytown, Pa. The FEP resin is commercially available from E. I. DuPont de Nemours and Co. of Wilmington, Del. To the mixture is also added 3 grams of Curative 50 (a bisphenol and phosphonium salt) available from Dupont.

After mixing, the resulting mixture is dissolved in methyl ethyl ketone to form a 25 weight percent solids solution. The resulting solution is ring coated onto the aluminum core by conventional methods, air dried for 16 hours, baked with a 2.5 hour ramp in an oven to 275° C., given a 30 minutes hold at 275° C., and then held 2 hours at 260° C. The resulting layer of fluorocarbon random copolymer has a thickness of 1 mil. The roller and the coating are then subjected to testing as described below.

COMPARATIVE EXAMPLE 2

A release agent donor roller is prepared with an aluminum core having thereover an outer layer of a cured interpenetrating network of fluorocarbon and silicone elastomers formed by conventional ring coating methods and substantially as described in U.S. Pat. No. 6,067,438, the teachings of which are also incorporated herein by reference. The dry thickness of the outer layer is 1 mil. The resulting donor roller is then subjected to testing as described below.

Testing of Release Agent Donor Roller Outer Layers

Oil Swell

Polymeric release agent (oil) swell is measured by immersing a weighed sample of siloxane material in 300 cts amine-functionalized poly(dimethylsiloxane) oil (Wacker 87087 amine-functional poly(dimethylsiloxane) oil obtainable from Wacker Silicones Corporation of Adrian, Mich.) for 24 hours and maintained at a temperature of 175° C., removing the sample from the oil, weighing the so-soaked sample, and then calculating the percent weight gain. The percentage change in weight is designed "oil swell" in Table 1.

TABLE 1

| Example or Comparative Example | Oil swell (% of change) |
|---|---|
| Example 1 | 18.77 |
| Example 3 | 21.12 |
| Example 5 | 15.36 |
| Comparative Example 1 | 0.0 |
| Comparative Example 2 | 0.0 |

Machine Testing

Three rollers (those corresponding to Examples 2, 4 and 6 above) are used as a release agent donor roller for supply of conventional amine-functionalized release oil and are tested in a fuser system substantially similar to that illustrated in FIG. 1 and described hereinabove. Two rollers (Comparative Examples 1 and 2) are also tested under identical conditions for comparison purposes. The results obtainable are shown below. The fuser system employed has the indicated conditions and test procedure, and utilizes a stainless steel metering roller. The developer employed comprises a toner having a polyester binder resin (having a Tg of 57° C.) and strontium ferrite carrier particles.

Test conditions:
1. Fusing temperature: 160±1° C.
2. Fusing nip: 17.5 millimeters (mm)
3. Fusing speed: 305 millimeters per sec (mm/s).

Test procedure:
1. Using a given paper, run 3000 11×17" sheets of a contamination image.
2. Rate the contamination on the donor and metering rollers using a qualitative visual scale of 0–5, with 0 being essentially no visible contamination and 5 being very heavy, visible contamination.

TABLE II

Fuser System Test Results

| Paper | Run # | Donor roller material | Donor roller contamination* | Metering roller contamination* | Oil Rate mg/A4 page |
|---|---|---|---|---|---|
| 118 gm coated | 1 | Comp. Example 1 | 2 | 0.5 | 6.21 |
| | 2 | Comp. Example 2 | 0 | 0 | 5.85 |
| | 3 | Example 2 | 0 | 0 | 5.15 |
| | 4 | Comp. Example 1 | 2 | 1 | 8.04 |
| 90 gm un-coated | 5 | Example 4 | 0 | 0 | 6.32 |
| | 6 | Comp. Example 2 | 0 | 4 | 7.68 |
| | 8 | Example 6 | 0 | 0.5 | 6.94 |
| | 9 | Example 2 | 0 | 0.5 | 6.54 |
| | 10 | Comp. Example 2 | 0 | 5 | 7.27 |

Contamination Rating: 0–5:
  0: No contamination;
  1: Very light contamination
  2: Light contamination
  3: Average contamination
  4: Heavy contamination
  5: Very heavy contamination Thus according to the present invention, a new and improved release agent donor roller and fusing system have been provided. In particular, a release agent donor roller having controlled polymeric release agent swell has been provided. This is achieved with a controlled polymeric release agent donor roller coating capable of transporting functional or nonfunctional polymeric release agent in sufficient quantities to the fuser roller.

The release agent donor roller of this invention possesses extremely desirable toner release characteristics and reduced toner offset as indicated in the tests results above. The release agent donor rollers have excellent toner release properties, without sacrificing toughness and abrasion resistance.

"Electrography" and "electrographic" as used herein are broad terms that include image forming processes involving the development of an electrostatic charge pattern formed on a surface with or without light exposure, and thus includes electrophotography and other similar processes.

Although the invention has been described in considerable detail, and with particular reference to preferred embodiments, it should be understood that variations and modifications to such embodiments can be made within the scope of the invention.

We claim:

1. A release agent donor roller for applying a polymeric release agent to a fuser roller in an electrophotographic apparatus, the donor roller comprising a base member with a polymeric outer layer thereover comprising a silicone material with a swelling in 300 cts poly(dimethylsiloxane) oil maintained at a temperature of 175° C. after 24 hours of greater than 15% by weight, said silicone material further including the addition polymerized reaction product of:

(a) at least one cross-linkable, vinyl-substituted poly(dialkylsiloxane) with a weight-average molecular weight before cross-linking of about 1,000 to about 90,000;

(b) from about 1 to less than 5 parts by weight per 100 parts of poly(dialkylsiloxane) of finely divided filler;

(c) at least one cross-linking agent comprising a multifunctional organo-hydrosiloxane having hydride functional groups capable of reacting with the vinyl functional groups of the poly(dialkylsiloxane); and

(d) at least one cross-linking catalyst present in an amount sufficient to induce addition polymerization of the poly(dialkylsiloxane) with the multifunctional organo-hydrosiloxane cross-linking agent.

2. The donor roller of claim 1 wherein the polymeric release agent has at least one functional group.

3. The donor roller of claim 2 wherein the functional group is selected from hydride, amino, or mercapto functionality.

4. The donor roller of claim 1 wherein the vinyl-substituted poly(dialkylsiloxane) is a vinyl-substituted poly($C_{1-8}$ alkylsiloxane).

5. The donor roller of claim 1 wherein the vinyl-substituted poly(dialkylsiloxane) comprises repeating units with the following structural formulas:

and terminal subunits having the general structure:

wherein:
R is an alkyl having from 1 to 8 carbon atoms;
Z is an olefinic group having from 2 to 8 carbon atoms and a terminal vinyl moiety;
Z' can be Z or R, provided that each molecule of vinyl-substituted poly(dialkylsiloxane) polymer has two or more Z moieties; and
L is —O— or —(CH$_2$)$_e$—, where e is an integer from 1 to about 8.

6. The donor roller of claim 1 wherein the vinyl-substituted poly(dialkylsiloxane) is a vinyl-substituted poly(dimethylsiloxane) having the formula:

wherein:
n is an integer such that the vinyl-substituted poly(dimethylsiloxane) has a weight average molecular weight of from about 1,000 to about 90,000.

7. The donor roller of claim 1 wherein the multifunctional organo-hydrosiloxane corresponds to the formula:

(VII)

wherein each T represents:

or both T's together represent atoms completing an organo-hydrosiloxane ring;
R$^a$ is alkyl having from 1 to 8 carbon atoms;
R$^b$ is H or R$^a$, provided that at least two R$^b$ moieties are H; and
q is from 3 to about 300.

8. The donor roller of claim 1 wherein the filler is selected from aluminum oxide, iron oxide, tin oxide, zinc oxide, copper oxide, or silica.

9. The donor roller of claim 1 wherein the filler is silica.

10. The donor roller of claim 1 wherein the silicone material comprises from about 1 to about 4 parts by weight of a finely divided filler per 100 parts of the crosslinkable vinyl-substituted poly(dialkylsiloxane).

11. The donor roller of claim 1 wherein the outer layer is from about 0.0125 to about 7.5 millimeters thick.

12. The donor roller of claim 1 wherein the outer layer is from about 3 to about 6 millimeters thick.

13. The donor roller of claim 1 wherein the outer layer has a hardness of greater than 20 Shore A.

14. The donor roller of claim 1 wherein the outer layer has a hardness of from about 30 to about 40 Shore A.

15. The donor roller of claim 1 wherein the siloxane material has a swelling in 300 cts poly(dimethylsiloxane) oil maintained at a temperature of 175° C. after 7 days which does not exceed 30% by weight.

16. A method for fusing a toner material comprised of a thermoplastic resin binder to a substrate, the method comprising:
forming a film of a release agent on the surface of a heated fuser member by contact of said fuser member with a release agent donor roller, the release agent donor roller comprising an outer layer of a silicone material with a swelling in 300 cts poly(dimethylsiloxane) oil maintained at a temperature of 175° C. after 24 hours of greater than 15% by weight,
contacting the toner material on the substrate with the heated fuser member for a time sufficient to soften the toner material, and
allowing the toner material to cool.

17. A method for fusing a toner material comprised of a thermoplastic resin binder to a substrate, the method comprising:
forming a film of a release agent on the surface of a heated fuser member by contact of said fuser member with a release agent donor roller, the release agent donor roller comprising an outer layer of an addition polymerized reaction product of:
(a) at least one cross-linkable, vinyl-substituted poly(dialkylsiloxane) with a weight-average molecular weight before cross-linking of about 1,000 to about 90,000;
(b) from about 1 to less than 5 parts by weight per 100 parts of poly(dialkylsiloxane) of finely divided filler;
(c) at least one cross-linking agent comprising a multifunctional organo-hydrosiloxane having hydride functional groups capable of reacting with the vinyl functional groups of the poly(dialkylsiloxane); and
(d) at least one cross-linking catalyst present in an amount sufficient to induce addition polymerization of the poly(dialkylsiloxane) with the multifunctional organo-hydrosiloxane cross-linking agent,
contacting the toner material on the substrate with the heated fuser member for a time sufficient to soften the toner material, and
allowing the toner material to cool.

18. A release agent donor roller for applying a polymeric release agent to a fuser roller in an electrophotographic apparatus, the donor roller comprising a base member with a polymeric outer layer thereover comprising a silicone material with a swelling in 300 cts poly(dimethylsiloxane) oil maintained at a temperature of 175° C. after 24 hours of greater than 15% by weight, the silicone material comprising an addition polymerized reaction product of:
(a) at least one cross-linkable, vinyl-substituted poly(dialkylsiloxane) with a weight-average molecular weight before cross-linking of about 1,000 to about 90,000;
(b) from about 1 to about 4 parts by weight per 100 parts of poly(dialkylsiloxane) of finely divided filler;
(c) at least one cross-linking agent comprising a multifunctional organo-hydrosiloxane having hydride functional groups capable of reacting with the vinyl functional groups of the poly(dialkylsiloxane); and
(d) at least one cross-linking catalyst present in an amount sufficient to induce addition polymerization of the poly(dialkylsiloxane) with the multifunctional organo-hydrosiloxane cross-linking agent.

19. A fusing system for fusing toner to a receiver in an electrophotographic apparatus, the fusing system comprising:
   (a) a fuser roller having an exterior surface and a pressure roller opposing said fuser roller and adapted to form a toning nip;
   (b) a reservoir for holding a polymeric release agent;
   (c) a metering roller adapted to receive a flow of the polymeric release agent from the reservoir; and
   (d) a release agent donor roller for receiving the polymeric release agent from the metering roller and applying the polymeric release agent to the exterior surface of the fusing roller, the release agent donor roller comprising an outer layer of a silicone material with a swelling in 300 cts poly(dimethylsiloxane) oil maintained at a temperature of 175° C. after 24 hours of greater than 15% by weight.

20. The fusing system of claim 19 wherein the donor roller further comprises a base member with the outer layer thereover.

21. The fusing system of claim 19 wherein the silicone material of the donor roller comprises a polymerized reaction product of:
   (a) at least one cross-linkable poly(dialkylsiloxane);
   (b) at least one cross-linking agent in an amount sufficient to yield a silicone material with a swelling in 300 cts poly(dimethylsiloxane) oil maintained at a temperature of 175° C. after 24 hours of greater than 15% by weight;
   (c) a minor amount of at least one particulate filler; and
   (d) a cross-linking catalyst in an amount effective to react the poly(dialkylsiloxane) with the cross-linking agent.

22. The fusing system of claim 19 wherein the polymeric release agent has at least one functional group.

23. The fusing system of claim 22 wherein the functional group is selected from hydride, amino, or mercapto functionality.

24. The fusing system of claim 21 wherein the silicone material comprises an addition polymerized reaction product.

25. The fusing system of claim 24 wherein the outer layer of the donor roller comprises the addition polymerized reaction product of:
   (a) at least one cross-linkable, vinyl-substituted poly (dialkylsiloxane) with a weight-average molecular weight before cross-linking of about 1,000 to about 90,000;
   (b) from about 1 to less than 5 parts by weight per 100 parts of poly(dialkylsiloxane) of finely divided filler;
   (c) at least one cross-linking agent comprising a multifunctional organo-hydrosiloxane having hydride functional groups capable of reacting with the vinyl functional groups of the poly(dialkylsiloxane); and
   (d) at least one cross-linking catalyst present in an amount sufficient to induce addition polymerization of the poly(dialkylsiloxane) with the multifunctional organo-hydrosiloxane cross-linking agent.

26. The fusing system of claim 25 wherein the vinyl-substituted poly(dialkylsiloxane) is a vinyl-substituted poly ($C_{1-8}$ alkylsiloxane).

27. The fusing system of claim 25 wherein the vinyl-substituted poly(dialkylsiloxane) comprises repeating units of at least one of the following structural formulas:

and terminal subunits having the general structure:

wherein:
   R is an alkyl having from 1 to 8 carbon atoms;
   Z is an olefinic group having from 2 to 8 carbon atoms and a terminal vinyl moiety;
   Z' can be Z or R, provided that each molecule of vinyl-substituted poly(dialkylsiloxane) polymer has two or more Z moieties; and
   L is —O— or —$(CH_2)_e$—, where e is an integer from 1 to about 8.

28. The fusing system of claim 25 wherein the vinyl-substituted poly(dialkylsiloxane) is a vinyl-substituted poly (dimethylsiloxane) having the formula:

wherein:
   n is an integer such that the vinyl-substituted poly (dimethylsiloxane) has a weight average molecular weight of from about 1,000 to about 90,000.

29. The fusing system of claim 25 wherein the multifunctional organo-hydrosiloxane corresponds to the formula:

(VII)

wherein each T represents:

or both T's together represent atoms completing an organo-hydrosiloxane ring;
   $R^a$ is alkyl having from 1 to 8 carbon atoms;

$R^b$ is H or $R^a$, provided that at least two $R^b$ moieties are H; and q is from 3 to about 300.

30. The fusing system of claim 25 wherein the filler is selected from aluminum oxide, iron oxide, tin oxide, zinc oxide, copper oxide, or silica.

31. The fusing system of claim 25 wherein the silicone material comprises from about 1 to about 4 parts by weight of a finely divided filler per 100 parts of the crosslinkable vinyl-substituted poly(dialkylsiloxane).

32. The fusing system of claim 19 wherein the outer layer is from about 3 to about 6 millimeters thick.

33. The fusing system of claim 19 wherein the outer layer has a hardness of from about 30 to 40 Shore A.

34. The fusing system of claim 19 wherein the siloxane material has a swelling in 300 cts poly(dimethylsiloxane) oil maintained at a temperature of 175° C. after 7 days which does not exceed 30% by weight.

35. The fusing system of claim 19 wherein the fuser roller is positively driven and the release agent donor roller is driven by frictional contact with the fuser roller.

36. A fusing system for fusing toner to a receiver in an electrophotographic apparatus, the fusing system comprising:

(a) a fuser roller having an exterior surface and a pressure roller opposing said fuser roller and adapted to form a toning nip;

(b) a reservoir for holding a polymeric release agent;

(c) a metering roller adapted to receive a flow of the polymeric release agent from the reservoir; and (d) a release agent donor roller for receiving the polymeric release agent from the metering roller and applying the polymeric release agent to the exterior surface of the fusing roller, the release agent donor roller comprising a base member with an outer layer of a silicone material thereover, the silicone material having a swelling in 300 cts poly(dimethylsiloxane) oil maintained at a temperature of 175° C. after 24 hours of greater than 15% by weight, the silicone material comprising an addition polymerized reaction product of:

(a) at least one cross-linkable, vinyl-substituted poly (dialkylsiloxane) with a weight-average molecular weight before cross-linking of about 1,000 to about 90,000;

(b) from about 1 to about 4 parts by weight per 100 parts of poly(dialkylsiloxane) of finely divided filler;

(c) at least one cross-linking agent comprising a multifunctional organo-hydrosiloxane having hydride functional groups capable of reacting with the vinyl functional groups of the poly(dialkylsiloxane); and (d) at least one cross-linking catalyst present in an amount sufficient to induce addition polymerization of the poly(dialkylsiloxane) with the multifunctional organo-hydrosiloxane cross-linking agent.

\* \* \* \* \*